US008821812B2

(12) United States Patent
Öhman et al.

(10) Patent No.: US 8,821,812 B2
(45) Date of Patent: Sep. 2, 2014

(54) METHOD AND MEANS FOR CREATING FLUID TRANSPORT

(75) Inventors: Per Ove Öhman, Uppsala (SE); Ib Mendel-Hartvig, Uppsala (SE)

(73) Assignee: Johnson & Johnson AB (SE)

( * ) Notice: Subject to any disclaimer, the term of this patent is extended or adjusted under 35 U.S.C. 154(b) by 881 days.

(21) Appl. No.: 11/471,061

(22) Filed: Jun. 19, 2006

(65) Prior Publication Data

US 2006/0285996 A1 Dec. 21, 2006

(30) Foreign Application Priority Data

Jun. 20, 2005 (SE) ...................................... 0501418

(51) Int. Cl.
*G01N 1/38* (2006.01)
*B01L 3/00* (2006.01)

(52) U.S. Cl.
CPC ....... *B01L 3/5025* (2013.01); *B01L 2300/0816* (2013.01)
USPC .......................................... 422/503; 436/180

(58) Field of Classification Search
CPC .......... B01L 2300/0816; B01L 3/5025; B01L 3/5027
USPC .................................. 422/502, 503; 436/180
See application file for complete search history.

(56) References Cited

U.S. PATENT DOCUMENTS

| | | | | |
|---|---|---|---|---|
| 6,143,576 | A | 11/2000 | Buechler | |
| 6,150,178 | A * | 11/2000 | Cesarczyk et al. | 436/165 |
| 6,156,270 | A | 12/2000 | Buechler | |
| 6,416,642 | B1 * | 7/2002 | Alajoki et al. | 204/451 |
| 6,436,722 | B1 | 8/2002 | Clark et al. | |
| 6,767,510 | B1 | 7/2004 | Buechler | |
| 2002/0004246 | A1 * | 1/2002 | Daniels et al. | 436/514 |
| 2003/0035758 | A1 | 2/2003 | Buechler et al. | |
| 2004/0077103 | A1 | 4/2004 | Buechler | |
| 2004/0115831 | A1 * | 6/2004 | Meathrel et al. | 436/514 |
| 2004/0126767 | A1 | 7/2004 | Anderberg et al. | |
| 2004/0142495 | A1 * | 7/2004 | Hartman et al. | 436/518 |
| 2004/0191127 | A1 * | 9/2004 | Kornblit et al. | 422/100 |
| 2005/0042766 | A1 * | 2/2005 | Ohman et al. | 436/174 |
| 2005/0136552 | A1 | 6/2005 | Buechler | |

FOREIGN PATENT DOCUMENTS

| | | |
|---|---|---|
| WO | WO 98/43739 A2 | 10/1998 |
| WO | WO-01/27627 | 4/2001 |
| WO | WO-03/103835 | 12/2003 |

OTHER PUBLICATIONS

Supplementary European Search Report for EP Application No. 06 747 937.8; mailed May 7, 2012; 6 pages.

* cited by examiner

*Primary Examiner* — Paul Hyun

(74) *Attorney, Agent, or Firm* — Hiscock & Barclay, LLP

(57) ABSTRACT

An absorbing zone for establishing and/or maintaining fluid transport through or along at least one fluid passage is manufactured on the basis of a non-porous substrate having a surface, the non-porous substrate having projections substantially perpendicular to the surface, and the projections having a height, diameter and a distance or distances between the projections such, that lateral capillary flow of the fluid in the zone is achieved.

14 Claims, 5 Drawing Sheets

METHOD AND MEANS FOR CREATING FLUID TRANSPORT

The present invention relates to the field of analytical and diagnostic tests, and in particular to a method and means for establishing or maintaining fluid transport in various devices, including carriers and substrates used in such tests.

CROSS-REFERENCE TO RELATED APPLICATION

This application is a Utility application claiming priority to Swedish Application Serial No. SE 0501418-8, filed Jun. 20, 2005, which is hereby incorporated by reference in its entirety

BACKGROUND

Many biochemical tests formerly performed in the laboratory using advanced equipment and skilled labor, can today be performed by a physician, a nurse or even the patient himself/herself, using small, often disposable devices. This is one result of a better understanding of biochemistry and medicine, as well as the ongoing miniaturization of both mechanics and electronics, taking place over the recent decades.

Such tests can be divided into two groups: "one-step tests" where a reaction takes place on a substrate after the addition of sample, and the result is detected as a change of one or more properties of said substrate; and "two-step tests", where the sample is followed by the addition of a detection conjugate, leading to a specific reaction resulting in a detectable signal.

In most assays, the detection conjugate and possible other reagents is pre-dispensed or integrated in the device, setting aside the need for separate addition of reagents by the user.

The most common type of disposable assay device consists of a zone or area for receiving the sample, a reaction zone, and optionally a transport or incubation zone connecting the receiving and reaction zone, respectively. These assay devices are known as immunochromatography assay devices or simply referred to as strip tests. They employ a porous material, such as nitrocellulose, defining a fluid passage capable of supporting capillary flow. The sample-receiving zone frequently consists of a more porous material, capable of absorbing the sample, and, when the separation of blood cells is desired, effective to trap the red blood cells. Examples of such materials are fibrous materials, such as paper, fleece, gel or tissue, comprised e.g. of cellulose, nitrocellulose, wool, glass fibre, asbestos, synthetic fibers, polymers, etc. or mixtures of the same. The transport or incubation zone commonly consists of the same or similar materials, often with different porosity than that of the sample-receiving zone. Likewise, the reaction zone, which may be integrated with the incubation zone, or constituting the most distal part thereof, commonly consists of similar, absorbing fibrous materials, such as nitrocellulose, or any of the above listed materials.

In an assay device or strip test, the porous material/-s is/are assembled on a carrier, such as a strip of thermoplastic material, paper, cardboard or the like. Further, a cover can be provided, said cover having at least one aperture for receiving the sample, and an aperture or a transparent area for reading the result of the assay.

Nitrocellulose materials are also frequently used as the matrix constituting the transport or reaction zone, connecting the receiving zone and the reaction zone. A significant disadvantage with nitrocellulose is its high non-specific binding of proteins and other bio-molecules. Present test strips however often handle a surplus of sample, reducing the influence of this binding. Another disadvantage of nitrocellulose is its variable quality, both with regard to chemical and physical properties. It is in any case desirable to minimize the sample volume, in line with the tendency to miniaturize the entire test, including minimizing the amounts of reagents, without compromising accuracy and reliability.

WO01/27627 is representative for the technical background, disclosing an assay device for quantification or detection of the presence or absence of an analyte in a liquid sample, comprising a molding permanently or removably attached to a substantially planar plate such that a part of said molding forms a capillary chamber between said plate and the said molding, the device further comprising a chamber into which a test sample and/or reagent can be introduced and further comprising a chamber capable of accommodating an absorbing pad, wherein the said chamber into which a test sample and said chamber capable of holding an absorbing pad are in lateral flow contact via the said capillary chamber.

U.S. Pat. No. 6,436,722 describes a device and method for integrated diagnostics with multiple independent fluid passages, and an absorbing block providing sufficient capillarity to pull the reagents into said absorbing and sustaining a separate second fluid passage that flows in a second direction from a first fluid passage. Notably, the absorbing block is stated to be capable of accommodating a volume of liquid in excess of the total sample volume and the total volume of all other liquid reagents.

The aim of the present inventors was to find alternative constructions, offering ease of production and cost savings, as well as the technical benefits associated with the micropillar structure, disclosed in WO 03/103835, by the same applicant. Further aims, solutions as well as their advantages will be evident to a skilled person upon study of the following description and non-limiting examples.

SUMMARY OF THE INVENTION

The present inventors have made available improved devices and methods for handling fluids to be assayed, in particular small amounts of sample, as frequently is the case in diagnostic and analytical determinations performed on biological samples. Embodiments of the present invention are directed to devices including at least one fluid passage for fluid transport, having a first end and a second end; and an absorbing zone specifically adapted to establish, maintain and/or meter fluid transport through or along said at least one fluid passage, wherein said absorbing zone comprises a non-porous substrate having a substrate surface, said zone having projections substantially perpendicular to said surface, and said projections having a height (H), diameter (D) and a distance or distances between the projections (t1, t2) such, that lateral capillary flow of said fluid in said zone is achieved.

Other embodiments concern methods for handling fluid transport in or along at least one fluid passage on or in a substrate, wherein the fluid transport in said passage is established and/or maintained and/or metered by an absorbing zone, arranged in fluid contact with said passage, and said absorbing zone comprising an zone made of a non-porous substrate, said zone having projections substantially perpendicular to said surface, and said projections having a height (H), diameter (D) and a distance or distances between the projections (t1, t2) such, that lateral capillary flow of said fluid on said zone is achieved.

Further embodiments of the inventive device and method are described in the following description, examples, drawings and claims, hereby incorporated by reference.

SHORT DESCRIPTION OF THE DRAWINGS

The invention will be described in detail in the following description of embodiments of the invention, non-limiting examples, and claims; with reference to the attached drawings in which;

Figure 6A:
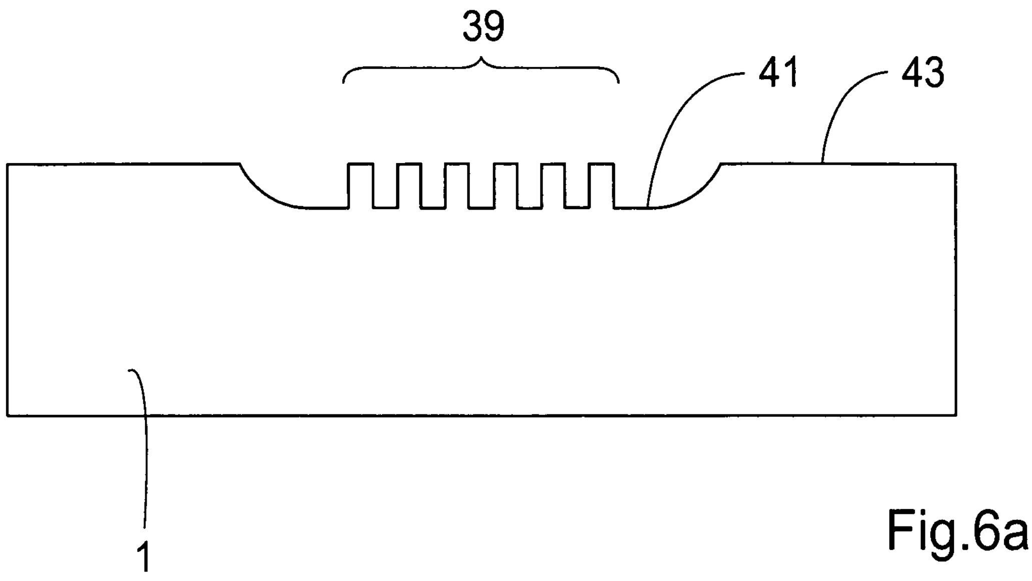
Figure 6B:
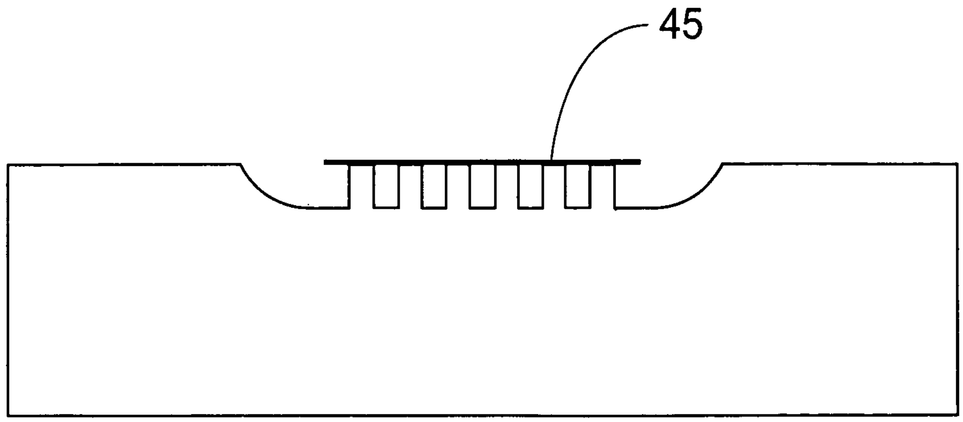
Figure 7:
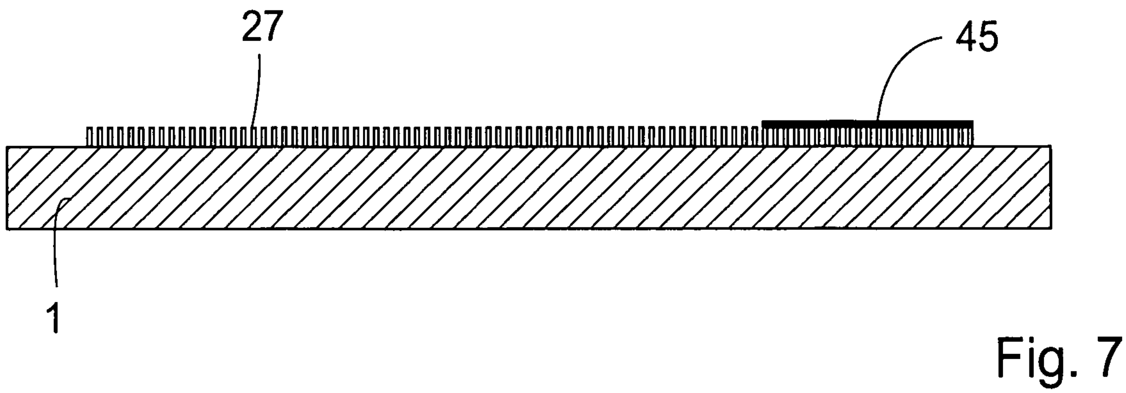
Figure 8:
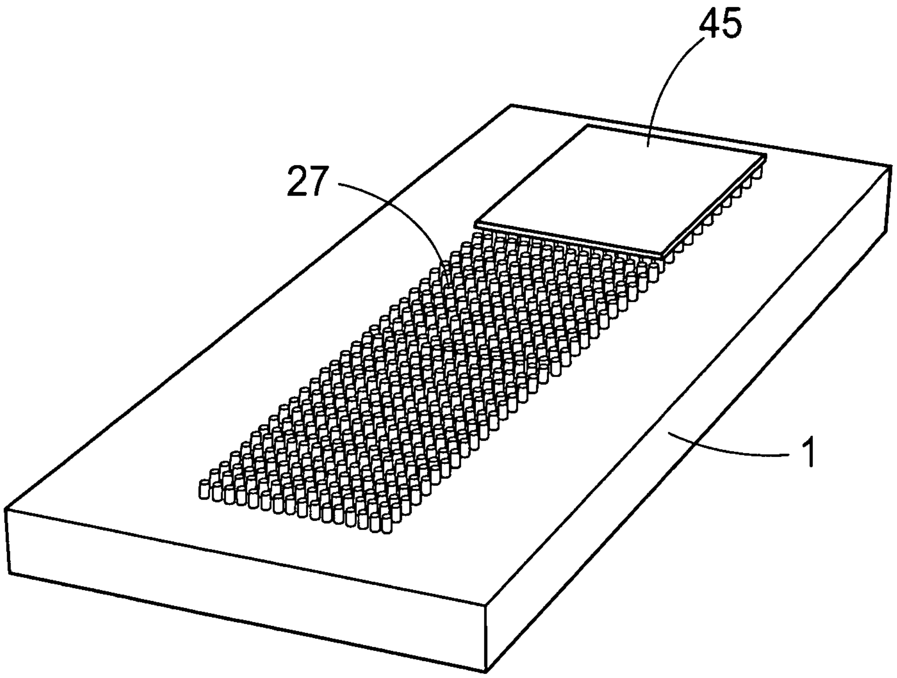

FIGS. 6*a* and 6*b* show schematic cross sections of the device according to two different embodiments;

FIG. 7 shows a side view of another embodiment;

FIG. 8 shows a perspective view of the embodiment of FIG. 7; and

Figure 9:
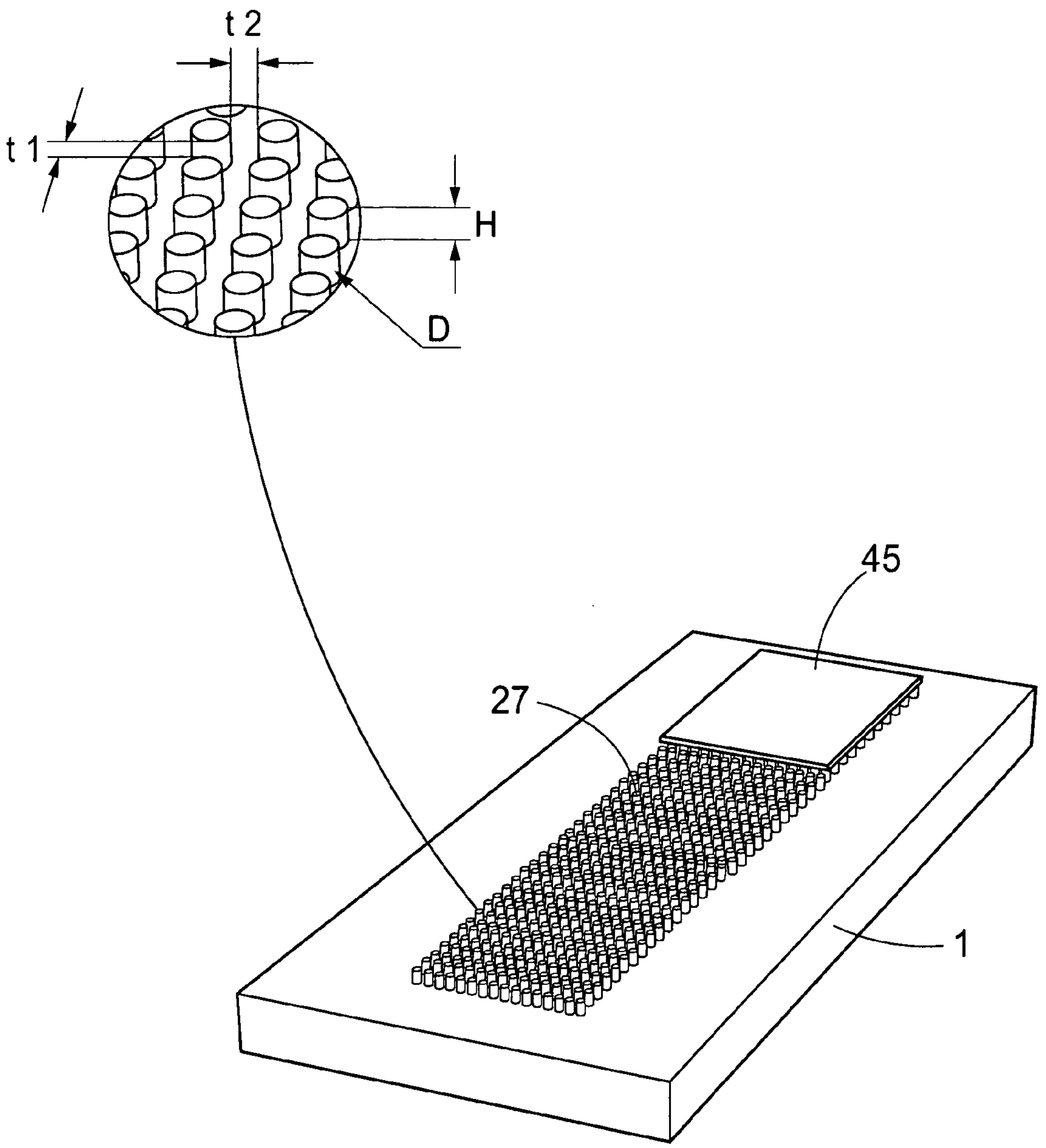

FIG. 9 shows a detail illustrating how the height (H), diameter (D) and a distance or distances between the projections (t1, t2) can be measured.

DESCRIPTION

Definitions

Before the present device and method is described, it is to be understood that this invention is not limited to the particular configurations, method steps, and materials disclosed herein as such configurations, steps and materials may vary somewhat. It is also to be understood that the terminology employed herein is used for the purpose of describing particular embodiments only and is not intended to be limiting since the scope of the present invention will be limited only by the appended claims and equivalents thereof.

It must also be noted that, as used in this specification and the appended claims, the singular forms "a", "an", and "the" include plural referents unless the context clearly dictates otherwise. Thus, for example, reference to a reaction mixture containing "a monoclonal antibody" includes a mixture of two or more antibodies.

The term "about" when used in the context of numeric values denotes an interval of accuracy, familiar and acceptable to a person skilled in the art. Said interval can be ±10% or preferably ±5%.

In describing and claiming the present invention, the following terminology will be used in accordance with the definitions set out herein.

The term "sample" here means a volume of a liquid, solution or suspension, intended to be subjected to qualitative or quantitative determination of any of its properties, such as the presence or absence of a component, the concentration of a component, etc. The sample may be a sample taken from an organism, such as a mammal, preferably a human; or from the biosphere, such as a water sample, or an effluent; or from an technical, chemical or biological process, such as a process of manufacturing, e.g. the production of medicaments, food, feed, or the purification of drinking water or the treatment of waste effluents. The sample may be subjected to qualitative or quantitative determination as such, or after suitable pre-treatment, such as homogenization, sonication, filtering, sedimentation, centrifugation, heat-treatment etc.

Typical samples in the context of the present invention are body fluids such as blood, plasma, serum, lymph, urine, saliva, semen, amniotic fluid, gastric fluid, phlegm, sputum, mucus, tears etc.; environmental fluids such as surface water, ground water, sludge etc.; and process fluids such as milk, whey, broth, nutrient solutions, cell culture medium, etc. The embodiments of the present invention are applicable to all samples, but preferably to samples of body fluids, and most preferably to whole blood samples.

The determination based on lateral flow of a sample and the interaction of components present in the sample with reagents present in the device and detection of such interaction, either qualitatively or quantitatively, may be for any purpose, such as diagnostic, environmental, quality control, regulatory, forensic or research purposes. Such tests are often referred to as chromatography assays, or lateral flow assays, as in e.g. immunochromatography assays.

Examples of diagnostic determinations include, but are not limited to, the determination of analytes, also called markers, specific for different disorders, e.g. chronic metabolic disorders, such as blood glucose, blood ketones, urine glucose (diabetes), blood cholesterol (atherosclerosis, obesitas, etc); markers of other specific diseases, e.g. acute diseases, such as coronary infarct markers (e.g. troponin-T), markers of thyroid function (e.g. determination of thyroid stimulating hormone (TSH)), markers of viral infections (the use of lateral flow immunoassays for the detection of specific viral antibodies); etc.

Another important field of diagnostic determinations relate to pregnancy and fertility, e.g. pregnancy tests (determination of i.a. human chorionic gonadotropin (hCG)), ovulation tests (determination of i.a. luteneizing hormone (LH)), fertility tests (determination of i.a. follicle-stimulating hormone (FSH)) etc.

Yet another important field is that of drug tests, for easy and rapid detection of drugs and drug metabolites indicating drug abuse; such as the determination of specific drugs and drug metabolites (e.g. THC) in urine samples etc.

The term "analyte" is used as a synonym of the term "marker" and intended to encompass any substance that is measured quantitatively or qualitatively.

The terms "zone", "area" and "site" are used in the context of this description, examples and claims to define parts of the fluid passage on a substrate, either in prior art devices or in a device according to an embodiment of the invention.

The term "reaction" is used to define any reaction, which takes place between components of a sample and at least one reagent or reagents on or in said substrate, or between two or more components present in said sample. The term "reaction" is in particular used to define the reaction, taking place between an analyte and a reagent as part of the qualitative or quantitative determination of said analyte.

The term "substrate" here means the carrier or matrix to which a sample is added, and on or in which the determination is performed, or where the reaction between analyte and reagent takes place.

The term "chemical functionality" comprises any chemical compound or moiety necessary for conducting or facilitating the assay. One group of chemical compounds, with particular relevance in the present invention, are compounds or components exhibiting specific affinity to, or capability of binding or interacting with, one or more components in the sample. Red blood cell separating agents constitute an illustrative example. Such agents may be any substance capable of aggregating or binding red blood cells.

The term "biological functionality" comprises all biological interactions between a component in a sample and a reagent on or in the substrate, such as catalysis, binding, internalization, activation, or other bio-specific interaction. Suitable reagents include, but are not limited to, antibodies, antibody fragments and derivates, single chain antibodies, lectines, DNA, aptamers, etc., including other polymers or molecules with binding capacity. Such reagents can be identified by a person skilled in the art, following the choice of the component to be separated, using standard experimentation, e.g. screening methods and chemical libraries.

The term "physical functionality" here comprises functionalities involved in reactions and interactions other than those that are mainly chemical or biological. Examples include diameter, height, shape, cross section, surface topography and surface patterns, the number of projections per unit area, wetting behavior of the surface of said projections, or a combination thereof, and/or other functionalities influencing the flow, retention, adhesion or rejection of components of the sample.

The distinctions between chemical, biological and physical interactions are not always clear, and it is possible that an interaction—such as an interaction between a component in a sample and a reagent on the substrate—involves chemical, biological as well as physical zones.

The terms "hydrophilic" and "hydrophobic", as in hydrophilic or hydrophobic compounds, hydrophilic or hydrophobic interactions etc., have the meaning generally understood by a person skilled in the art, and corresponding to that used in generally recognized textbooks.

DESCRIPTION OF PREFERRED EMBODIMENTS

Within the scope of the present invention embodiments of a device for handling fluids, including at least one fluid passage for fluid transport, and an absorbing zone for establishing and/or maintaining fluid transport through or along said at least one fluid passage, wherein said absorbing zone comprises an zone made of a non-porous substrate, said zone having projections substantially perpendicular to said surface, and said projections having a height (H), diameter (D) and a distance or distances between the projections (t1, t2) such, that lateral capillary flow of said fluid in said zone is achieved. In addition to optimizing the above-mentioned height, diameter and a distance or distances between the projections, the projections may be given a desired chemical, biological or physical functionality, e.g. by modifying the surface of said projections.

Said device is preferably a disposable assay device or a part of such device, such as a diagnostic or analytic assay device. Said at least one fluid passage may be any fluid passage, capable of establishing fluid connection between the location where sample is added, thorough a reaction zone and optional incubation zone(-s), to an absorbing zone.

In embodiments according to the invention, the sample can flow along one fluid passage, or be diverted into two or more, parallel fluid passages. Alternatively, several samples are added to two or more, parallel fluid passages. Similarly, said fluid passages may be continuous or intermittent, the latter meaning that the fluid passage is broken by valves, time gates or locks, regulating the flow velocity, volume or timing of the flow.

In one embodiment, said at least one fluid passage is a passage supporting capillary flow. Examples of passages supporting capillary flow are open or closed capillaries, grooves, channels, wicks, membranes, filters, gels or the like. The fluid passage preferably incorporates or consists partially or entirely of an open lateral fluid passage supported by substantially perpendicular projections, such as the micropillars disclosed in WO 03/103835, by the same applicant. Said projections or micropillars are preferably made of a non-porous substrate, and form projections substantially perpendicular to said surface, said projections having a height (H), diameter (D) and a distance or distances between the projections (t1, t2) such, that lateral capillary flow of said fluid in said zone is achieved. In addition to optimizing the above-mentioned height, diameter and a distance or distances between the projections, the projections may be given a desired chemical, biological or physical functionality, e.g. by modifying the surface of said projections.

Figure 3:
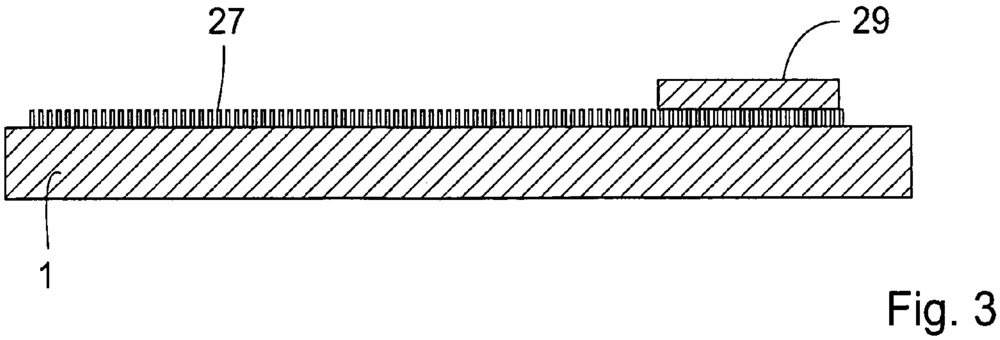
FIG. 3 shows a side view of a device according to an embodiment of the invention.
Figure 4:
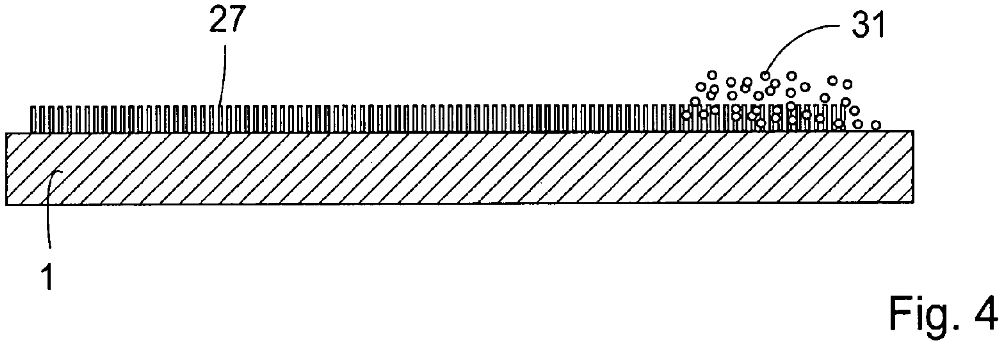
FIG. 4 shows a side view of another embodiment of the invention.
Figure 5:
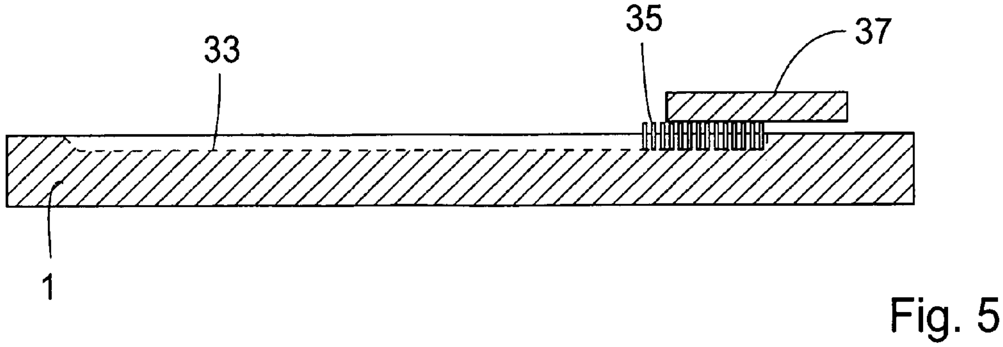
FIG. 5 shows a side view of yet another embodiment.

According to one embodiment, an absorbing material is deposited on or in said zone. Said absorbing material is chosen among cellulose-containing materials, hygroscopic salts, hydrophilic polymer structures, solid hygroscopic particles, porous particles of cross linked networks of flexible polymer chains, such as porous particles of cross linked dextran or agarose, superabsorbents, absorbing foams, such as polyurethane foams, etc. This is schematically illustrated in FIGS. 3, 4 and 5. In FIG. 3 a device (1) is shown having a fluid passage (27), here shown as consisting of substantially perpendicular projections, leading to and in fluid communication with an absorbing pad (29), paced in fluid contact with the fluid passage.

In FIG. 4, the substrate (1) carries a fluid passage (27), here shown as consisting of substantially perpendicular projections, at the distal portion of which absorbing particles (31) are disposed between the perpendicular projections. This embodiment has the advantage of ensuring good adhesion of the absorbing particles to the device, and good contact between the liquid and the particles.

In FIG. 5 is shown a particular embodiment where on a substrate (1) a fluid passage (33) is provided in the form of a groove or channel in the surface of said substrate, where in the distal part of said channel, an area (35) of projections are provided, said projections forming a transition between said channel and an absorbing zone (37) in fluid communication with said channel via said projections. This embodiment has the advantage of ensuring good contact between the fluid in the channel or groove, and the absorbing zone, provided on the projections.

Superabsorbents or superabsorbing polymers (SAPs) such as polyacrylate crystals and gels, are well known to a skilled person, and commercially available (e.g. DRYTECH®, The Dow Chemical Company, USA).

Figure 2:
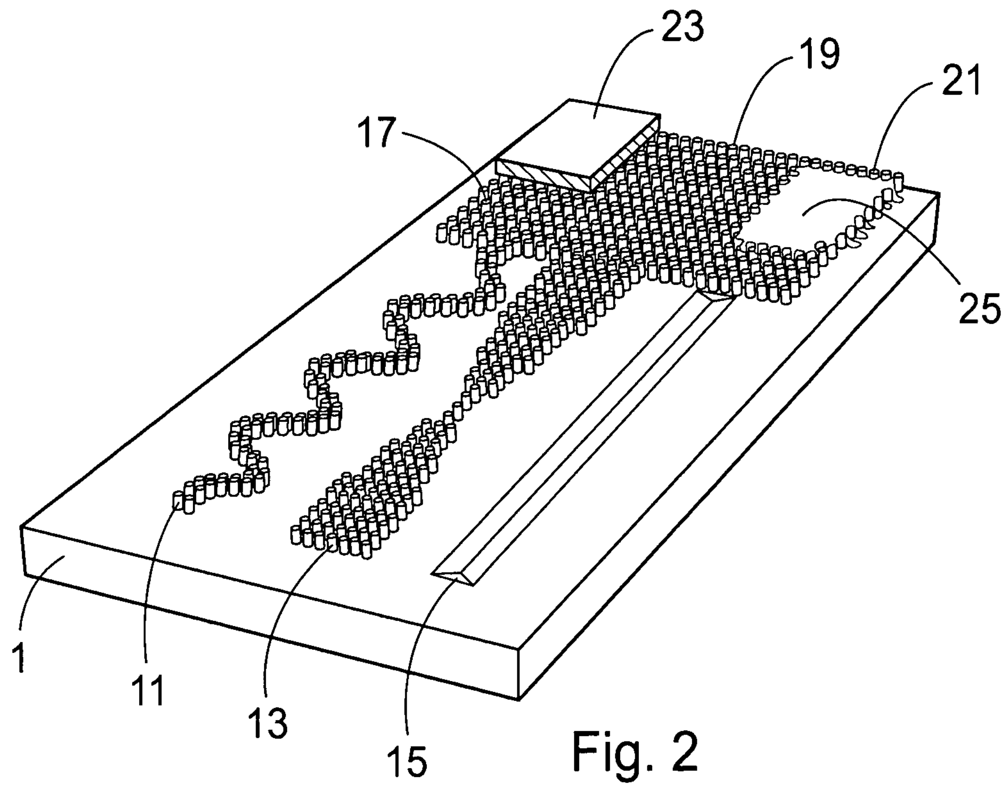
FIG. 2 shows schematically a perspective view of another device according to an embodiment of the invention.

This embodiment is illustrated in FIG. 2, showing a perspective view of a device (1) having three fluid passages (11, 13, and 15) each in fluid connection with a separate absorbing zone (17, 19, 21). In this embodiment, the third fluid passage (15) is shown as a groove in the surface of the substrate (1) leading to the corresponding, third absorbing zone (25). Thus the third fluid passage as such does not support capillary flow.

In FIG. 2, the first absorbing zone (17) comprises an absorbing pad (23) attached to, and in fluid connection to the zone (17). The second absorbing zone (19) comprises an absorbing material, deposited between the substantially perpendicular projections of said zone. The third absorbing zone (21) comprises foam, deposited on and between the substantially perpendicular projections of said zone.

FIG. 6*a* shows a cross section of an embodiment where the fluid passage comprising substantially perpendicular projections (39) is situated in a channel in a substrate so, that the bottom or "floor" of the channel is lower than the general surface (43) of the substrate. It is preferred that the top of the projections is level with said surface (43) in order to simplify production and provide protection for the perpendicular projections.

FIG. 6*b* shows a related embodiment where a cover or foil 45 is placed on the top of the perpendicular projections. This serves, inter alia, to accurately limit the volume defined by the projections. It can also be used to modify, preferably enhance the absorption capacity or rate of absorption of the absorption zone, e.g. by influencing the hydrophobic properties of the zone. In FIG. 9, a detail view shows how the above height (H), diameter (D) and a distance or distances between the projections (t1, t2) is measured.

In one embodiment, the micropillars or projections have a height in the interval of about 15 to about 150 μm, preferably about 30 to about 100 μm, a diameter of about 10 to about 160 μm, preferably 20 to about 80 μm, and a distance or distances between the projections of about 5 to about 200 μm, preferably 10 to about 100 μm from each other. The flow channel may have a length of about 5 to about 500 mm, preferably about 10 to about 100 mm, and a width of about 1 to about 30 mm, preferably about 2 to about 10 mm. It should in this context be noted that a device according to an embodiment of the invention does not necessarily have to have a uniform area of micropillars, but that the dimensions, shape and a distance or distances between the projections of the micropillars may vary in the device. Likewise, the shape and dimensions of the fluid passage may vary.

In another embodiment, said at least one fluid passage is a passage, which as such does not support capillary flow. The main examples of such passages are open or closed passages of a diameter so large, that capillary action do not take place. A passage of this kind is filled with liquid, only when an excess of liquid is added, by the action of gravity, centrifugation, pumping or other external influence. According to the invention, such a passage not capable of supporting capillary flow, can be connected to an absorbing zone, in which case the absorbing zone will establish flow in the passage. According to a preferred embodiment, said zone is designed so, that the volume drawn by the zone, and made to pass optional incubation zones and a reaction zone, is determined by the volume of said zone, and not by the amount of sample added to the device.

According to another preferred embodiment, a device according to the invention comprises two or more parallel passages leading to same absorbing zone or to sections of the same zone. A device according to this embodiment is particularly suitable for assays where multiple analytes are to be determined in one sample. Each fluid passage is provided with its own set of reagents, and a fraction of the sample enters each passage and reacts with the specific reagents deposited or otherwise present in than passage.

Figure 1:
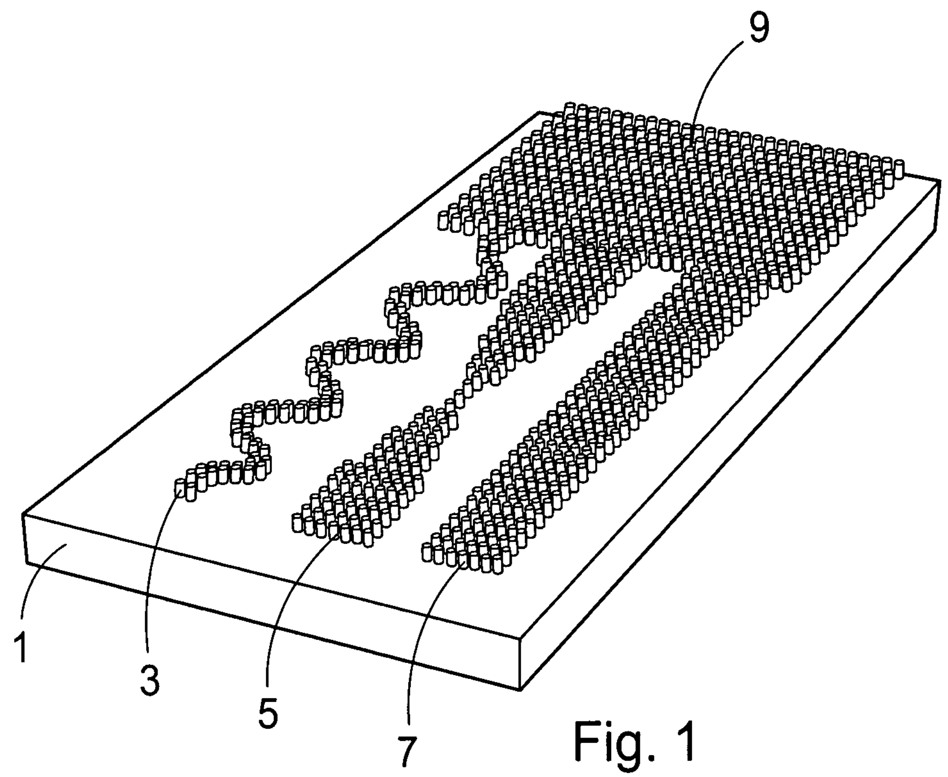
FIG. 1 shows schematically a device with parallel fluid passages according to an embodiment of the invention.

FIG. 1 schematically shows an embodiment comprising a substrate (1) having three fluid passages (3, 5, and 7) each in fluid connection with an absorbing zone (9) here illustrated as an area having projections substantially perpendicular to its surface. Here, all three fluid passages comprise projections capable of creating or supporting capillary flow. When used in an assay application, the sample is added at or near the proximal end of the passages 3, 5 or 7, as shown in FIGS. 1 and 2, or at the left hand end of the passage 27 shown in FIG. 3, 4 or 5.

According to this and similar embodiments, simultaneous or sequential flow of a fluid in said parallel passages is achieved by adapting the length, width, depth or other property of said passage. For example, a long, meandering passage (e.g. as shown in FIGS. 1 and 3, reference numerals 3 and 11) is used when long incubation times are desired. A branched passage is used when several reagents are added, or when the same sample is subjected to several analyses. One example of an application where a sample is subjected to several analyses is the field of multiplex analyses where the presence and/or activity of various proteins is simultaneously analysed in one sample. Other applications include multiplex detection of the presence and/or activity of members of specific groups of proteins in a single sample; the simultaneous detection of different protein modifications, e.g. phosphorylation and ubiquitination; and the simultaneous detection of proteins that bind specific capture proteins and proteins that bind specific nucleic acid sequences, in one sample. Bead-based multiplex analysis is well known to a skilled person in this field, and suitable beads with immobilized reactants and detection conjugates are commercially available. The bead technology can be adapted to the device according to the present invention, or the reactants and conjugates immobilized to the substrate used in the inventive device.

According to one embodiment of the invention, the fluid capacity of the absorbing zone is at least equal to and preferably at least two times the volume of fluid to be transported. According to a preferred embodiment, the capacity of the absorbing zone determines the amount of sample drawn into the reaction zone, making the device independent of metering of the sample.

The substantially perpendicular projections according to the embodiments of the invention, are preferably given chemical, biological or physiological properties, including hydrophilic properties, suitable for the assay in question, and suitable for the desired flow rate and capacity. On example is coating the projections with dextran.

The present invention also makes available a method for handling fluid transport in or along at least one fluid passage on a substrate, wherein fluid transport in said passage is established and/or maintained by an absorbing zone, arranged in fluid contact with said passage, and said absorbing zone being an zone made of a non-porous substrate, said zone having projections substantially perpendicular to said surface, and said projections having a height (H), diameter (D) and a distance or distances between the projections (t1, t2) such, that lateral capillary flow of said fluid on said zone is achieved.

In said method, said substrate preferably forms at least a part or section of a disposable assay device.

According to a preferred embodiment, absorbing material is deposited on said absorbing zone. Said absorbing material is preferably chosen among cellulose-containing materials, including reinforced cellulose-containing materials, such as cellulose possibly containing glass fibre, nitrocellulose, hygroscopic salts, hydrophilic polymer structures, hydrophilic solid particles, porous particles of cross linked networks of flexible polymer chains, such as porous particles of cross linked dextran or agarose, or cross linked polyacrylamide, superabsorbent materials, polyurethane foams, etc.

In a method according to the invention, the sample can be divided between two or more fluid passages, wherein least one fluid passage is a passage supporting capillary flow. Alternatively, said at least one fluid passage is a passage which as such does not support capillary flow.

It is obvious that the drawings only illustrate embodiments of the invention in a non-limiting fashion, and that the features are interchangeable between said embodiments. For example the groove or channel (33) in FIG. 5 is equally suitable in place of one or more of the fluid passages (3, 5, and 7) in FIG. 1 or the fluid passages (11, 13, and 15) in FIG. 2, respectively. Likewise, the different shapes of the fluid passages, here shown as a meandering passage (3, 11), an hourglass shaped passage (5, 13), and a substantially straight passage or groove (7, 15, and 33) are illustrative only. A fluid passage in a device and method according to the invention may also be maze-shaped, branched, interconnected or have other configurations, known to a skilled person within the relevant field.

According to one embodiment, the sample or fractions thereof is/are led through parallel passages leading to same absorbing zone or to sections of the same zone.

According to another embodiment, simultaneous or sequential flow of a fluid in said parallel passages is achieved by adapting the length, width, depth or other property of said passage.

Further, in a method according to the invention, the fluid capacity of the absorbing zone is at least equal to and preferably at least two times the volume of fluid to be transported. According to a preferred embodiment of the invention, the absorption capacity of the absorbing zone determines the amount of sample and/or reagent/-s drawn through the fluid passage, including reaction and detection zones, and optional incubation zones. Accordingly, the method includes the accurate metering of sample or reagents, and becomes independent of the amount of sample or reagents added.

The invention encompasses any analytical or diagnostic test device comprising a device as defined by the invention and its embodiments, as well as any method comprising the use of such devices or a step as defined herein.

Advantages

The embodiments of the invention make it possible to replace the conventional absorbing pad with a more compact construction, where the underlying perpendicular projections guarantee the uniformity and reliability of the absorbing zone. The perpendicular projections guarantee a smooth transition from a fluid passage to the absorbing zone, as well as an even distribution of the sample fluid within said absorption zone.

The embodiments make it possible to accurately measure and regulate the amount of sample and/or reagent drawn through the fluid passage, including the detection zone and optional incubation zones.

The embodiments also simplify the adjustment of the sensitivity of existing tests, and are equally applicable to small or large volumes of sample.

The use of a foil to cover the absorbing zone not only helps to very accurately define the volume, it also opens up for modifying the flow velocity. With an identical structure and identical volume, the flow velocity can be adjusted by applying different foils to the structure.

The embodiments are particularly suitable for the mass-production of disposable devices having identical flow channels, and highly repeatable features with regard to capacity, flow and reaction times. The embodiments are suitable for being manufactured from well characterized polymeric materials, replacing entirely or in part less well defined fibrous materials.

The embodiments further make it possible to accurately adjust the absorbing capacity within a large interval, making it possible to tailor disposable analysis devices to various applications.

Further advantages will be apparent to a skilled person upon study of the description, figures and non-limiting examples.

EXAMPLES

Materials and Methods

Micropillar structures as described in WO 03/103835 were produced by Amic AB, Uppsala, Sweden, and used to form both the capillary flow channel and the transition and support for an absorbing zone. A positive master including the structures to be tested was made by etching the structures in silica, and a negative mold as made in nickel, using said silica master. Multiple test structures were manufactured by thermoplastic extrusion against the negative mold, producing the structures on a polypropylene disc, 1 mm thick, which was cut into strips, each having a fluid passage or open flow channel consisting of perpendicular projections or micropillars. The strips had the same dimensions as a typical microscope slide, i.e. 20×76 mm, for practical reasons.

The micropillars had the following dimensions: 69 μm in height, 46 μm in diameter and placed at approximately 29 μm distance or distances from each other. The flow channel had a length of 25 mm and a width of 5 mm. The last 5 mm was used as support for the absorbing materials, defining an absorbing zone of about 5×5 mm.

The steady state flow was measured by applying 10 μL of a buffer, composed of 0.25% Triton X-100, 0.5% BSA, 0.3M NaCl, 0.1 M Tris-buffer pH 7.0, in sequence five times. The time for the disappearance of buffer was timed. The last five was used for steady state calculation.

Example 1

Capillary Flow Using Porous Micro Beads as Absorbing Means 25 mg of dry Sephadex G25 (medium, Amersham Biosciences, Uppsala, Sweden) was placed at the far end of the flow channel, dispersed among the perpendicular projections. The flow was measured by buffer additions as described above. The results are shown in Table 1:

TABLE 1

| Addition | Chip A μL/min | Chip B μL/min |
|---|---|---|
| 1 | 7.1 | 7.1 |
| 2 | 6.7 | 7.0 |
| 3 | 6.7 | 6.8 |
| 4 | 6.9 | 6.7 |
| 5 | 7.1 | 7.1 |

Preliminary experiments using another fraction of the same micro beads, Sephadex G25 (superfine, Amersham Biosciences, Uppsala, Sweden) indicated that the particle size significantly influences the flow.

Example 2

Capillary Flow Using Cellulose/Glass Fiber Filters as Absorbing Means

A 25 mm long and 5 mm wide CF6 (Whatman, Maidstone, England) absorbing filter was placed at the far end of the flow channel, resting on the perpendicular projections. The flow was measured by buffer additions as described above. The results are shown in Table 2:

TABLE 2

| Addition | Chip C μL/min | Chip D μL/min |
|---|---|---|
| 1 | 11 | 11 |
| 2 | 12 | 11 |
| 3 | 12 | 10 |
| 4 | 11 | 11 |
| 5 | 11 | 11 |

The results indicate that a well functioning interface was formed between the fluid passage, the projections and the absorbing filter material, and that significant flow rated were achieved.

Example 3

Capillary Flow Using Foam Material as Absorbing Means

Polyurethane foam was cured in situ on the device, in the far end of the flow channel, in an area consisting of perpendicular projections. The foam filled the space between the projections, providing good fluid communication with the remaining flow channel. The time for 100 ul to be absorbed by the foam was measured three times for different samples. The results (Table 3) showed that a foam can serve as the absorbing zone and that relevant flow is achieved. It is anticipated that optimization of the foam with regard to porosity, curing and other properties, will result in even better flow rates.

TABLE 3

Obtained results for wicking. The y axis reports time to absorb 100 μL of water

| Sample | time 1 | time 2 | time 3 | Average |
|---|---|---|---|---|
| 1.1 | 2.30 | 4.30 | 3.10 | 3.23 |
| 1.2 | 1.30 | 2.00 | 2.00 | 1.77 |
| 2.1 | 5.00 | 5.00 | 5.00 | 5.00 |
| 2.2 | 2.45 | 3.00 | 2.55 | 2.67 |
| 3.1 | 0.22 | 0.23 | 0.30 | 0.25 |
| 3.2 | 0.33 | 0.35 | 0.38 | 0.35 |
| 4.1 | 0.30 | 0.41 | 1.05 | 0.59 |
| 4.2 | 0.35 | 0.35 | 1.05 | 0.58 |
| 5.1 | 1.30 | 1.40 | 1.45 | 1.38 |
| 5.2 | 1.45 | 1.50 | 2.15 | 1.70 |
| 6.1 | 1.55 | 2.10 | 2.15 | 1.93 |
| 6.2 | 1.25 | 2.31 | 2.33 | 1.96 |
| 7.1 | 3.50 | 4.20 | 4.30 | 4.00 |
| 7.2 | 3.40 | 4.25 | — | 2.55 |
| 8.1 | 4.20 | 4.49 | — | 2.90 |
| 8.2 | — | — | — | 0.00 |
| 3.2-A | 2.40 | 3.10 | 3.5 | 3.00 |
| 3.2-B | | | | 0.00 |
| 3.2-2 | | | | 0.00 |

Example 4

Foil Dependent Flow

Test strips were produced, having a fluid passage consisting of or leading into an area of micropillars having the following dimensions: 69 μm in height, 46 μm in diameter and placed at approximately 29 μm distance or distances from each other. The flow channel had a length of about 25 mm and a width of 4 mm. The distal end—relative to the sample addition—as covered with an adhesive foil. Different foils having hydrophilic and hydrophobic adhesives were tested (samples provided by Adhesives Research Inc., USA).

Flow was tested using phosphate buffered saline with an addition of 0.015% Tween-20. The results are shown in Table 4.

TABLE 4

Effect of foil on flow velocity in a micropillar structure

| | Width of fluid passage | | |
|---|---|---|---|
| | 4 mm Flow (μl/min) | 2 mm Flow (μl/min) | Total volume (μl) |
| None (open structure) | 11 | 7 | 40 |
| Hydrophilic foil | 15 | 8 | 30 |
| Hydrophobic foil | Very slow | Very slow | NA |

The results show that covering the distal end of the wider fluid passage (4 mm) with a hydrophilic foil significantly increased the flow velocity. It is likely that the lesser improvement achieved in the more narrow fluid passage (2 mm) is accountable to structural differences. In a narrow fluid passage, the effect of the exposed sides becomes greater. It is contemplated that, by adjusting the properties of the adhesive, e.g. by choosing different degrees of wetting behavior or hydrophilicity, the flow velocity can be accurately adjusted for various sample fluids.

In general, all experimental results show that the inventive concept works in practice, and that the provision of an absorbing zone significantly increased the absorption capacity and flow velocity in a device according to the invention. The experiments using a foil, intimately arranged on projections or the micropillar structure, show that not only does this define the volume very accurately, it also influences the flow velocity.

Although the invention has been described with regard to its preferred embodiments, which constitute the best mode presently known to the inventors, it should be understood that various changes and modifications as would be obvious to one having the ordinary skill in this art may be made without departing from the scope of the invention as set forth in the claims appended hereto.

The invention claimed is:

1. A device for handling a fluid to be assayed, said device comprising:

a non-porous substrate having a substrate surface;

at least one open fluid passage integrated into said substrate, said at least one fluid passage having a first end at which fluid is added to said device and a second end opposite said first end, said at least one open fluid passage being capable of supporting capillary flow; and at least one separate absorbing zone in fluid contact with said second end of said at least one open fluid passage, said at least one open fluid passage, including said at least one absorbing zone each comprising a plurality of projections substantially perpendicular to said substrate surface, said plurality of projections each having a height, diameter and a distance or distances between the projections, capable of generating capillary flow, lateral to said substrate surface, of a fluid added to the first end of said at least one open fluid passage and contacting said at least one absorbing zone in fluid contact with said second end of said at least one open fluid passage, and a foil directly placed on the top of the perpendicular projections of said at least one absorbing zone, said foil being solely and fully supported upon the projections and having hydrophilic properties to influence the flow velocity of fluid along said substrate surface from said first end to said second end of said open fluid passage and to accurately limit the fluid volume defined by said projections and in which said substrate, said at least one open fluid passage, and said at least one separate absorbing zone are made from the same material.

2. The device according to claim 1, wherein said device is a disposable assay device or a part of such device.

3. The device according to claim 1, wherein said device comprises parallel fluid passages leading to the same absorbing zone or to sections of the same absorbing zone.

4. The device according to claim 1, wherein said device comprises parallel fluid passages leading to two or more absorbing zones made up of said projections, each of said absorbing zones exhibiting the same or different absorption capacity.

5. The device according to claim 4, wherein one or both absorbing zones are covered by said foil upon said projections, the absorbing zones exhibiting the same or different fluid capacity.

6. The device according to claim 1, wherein the fluid capacity of the absorbing zone is at least equal to the volume of fluid to be transported.

7. The device according to claim 1, wherein the volume of sample delivered along the at least one fluid passage is determined by the at least one absorbing capacity of the absorbing zone, and not by the amount of sample added to the device.

8. A method for maintaining and promoting fluid transport in an assay device, the method comprising the steps of:

providing at least one open fluid passage on a non-porous substrate defining said device and having a substrate surface, said at least one open fluid passage having a first end and a second end opposite said first end capable of supporting capillary flow;

separately providing at least one absorbing zone in fluid contact with said second end of said at least one fluid passage, said at least one open fluid passage, including said at least one absorbing zone including a plurality of projections extending substantially perpendicular to said substrate surface, said projections having a height, diameter and distance or distances between said projections to spontaneously induce lateral capillary flow of a fluid placed in contact with the first end of said open fluid passage, each of said at least one fluid passage and absorbing zone being made from the same material as that of said non-porous substrate;

placing a foil directly upon the top of said perpendicular projections of said at least one absorbing zone, said foil being solely and fully supported upon the projections of said absorbing zone;

influencing the flow velocity of fluid added to said device along said at least one fluid passage by selection of hydrophilic properties of the foil; and establishing and maintaining fluid transport in said at least one open fluid passage of a volume of fluid from said first end toward said second end of said at least one fluid passage, wherein said fluid transport is established and maintained by the absorbing capacity of said at least one provided absorbing zone and not by the volume of fluid added to the first end.

9. The method according to claim 8, including the step of making said substrate a part of a disposable assay device.

10. The method according to claim 8, wherein said device comprises parallel passages leading to the same absorbing zone or to sections of the same zone, exhibiting the same or different absorption capacity.

11. The method according to claim 8, including at least two absorbing zones separately disposed on said device, each said absorbing zone being made up of said projections, said method including the step of covering one or both absorbing zones by a foil, the zones exhibiting the same or different absorbing capacity.

12. The method according to claim 8, wherein the capacity of the at least one absorbing zone is at least equal to the volume of fluid to be transported.

13. A device for handling a fluid to be assayed, said device comprising:

a non-porous substrate having a substrate surface;

at least one open fluid passage integral to said substrate, said at least one fluid passage having a first end and a second end opposite said first end in which fluid transport is initiated and maintained in a flow direction from the first end toward said second end of said at least one fluid passage;

at least one separate absorbing zone, said at least one absorbing zone being integral to said substrate and in fluid contact with said second end of said at least one fluid passage, said at least one open fluid passage and said at least one absorbing zone comprising a plurality of projections having a height, diameter and a spacing between the projections that spontaneously produces capillary flow, in a direction which is lateral to said substrate surface, of a fluid placed in contact with said first end of said at least one open fluid passage, said at least one fluid passage and said at least one absorbing zone being made from the same material as said substrate; and a foil directly placed onto at least a portion of the plurality of projections of said at least one absorbing zone, said foil being solely and fully supported by the projections of said absorbing zone and having hydrophilic properties for influencing the flow velocity of fluid along said at least one fluid passage from said first end to said second end of said device.

14. The device according to claim 13, wherein the volume of fluid delivered along the at least one fluid passage is determined by the absorbing capacity of the at least one absorbing zone, and not by the amount of fluid added to the device for transport at the first end of said at least one fluid passage.

* * * * *